US 6,954,634 B1

(12) United States Patent
Bucknell et al.

(10) Patent No.: US 6,954,634 B1
(45) Date of Patent: Oct. 11, 2005

(54) RECONFIGURABLE COMMUNICATION NETWORK

(75) Inventors: Paul Bucknell, Brighton (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/552,650

(22) Filed: Apr. 19, 2000

(30) Foreign Application Priority Data

Apr. 23, 1999 (GB) .................................. 9909275

(51) Int. Cl.$^7$ ............................. H04M 3/00; H04L 1/00
(52) U.S. Cl. ..................... 455/418; 455/419; 455/420; 455/425; 455/70; 370/252; 370/278
(58) Field of Search ............................... 455/418, 419, 455/425, 519, 518, 552, 70, 420; 70/252, 70/278, 328, 329, 465; 370/252, 278, 328, 370/329, 465

(56) References Cited

U.S. PATENT DOCUMENTS

| | | | | |
|---|---|---|---|---|
| 5,950,124 A | * | 9/1999 | Trompower et al. | ......... 455/422 |
| 6,041,228 A | * | 3/2000 | Niska et al. | ................. 455/419 |
| 6,112,206 A | * | 8/2000 | Morris et al. | ................. 707/10 |
| 6,144,849 A | * | 11/2000 | Nodoushani et al. | ........ 455/419 |
| 6,421,374 B2 | * | 7/2002 | Blakeney, et al. | .......... 375/220 |

FOREIGN PATENT DOCUMENTS

| | | | | |
|---|---|---|---|---|
| EP | 0825791 A1 | 8/1996 | ............ | H04Q 7/32 |
| EP | 0538933 B1 | 4/1998 | ............ | H04Q 7/18 |
| WO | 9838820 A2 | 9/1998 | ............ | H04Q 7/22 |

OTHER PUBLICATIONS

By F. P. Van Enk, FM-900 Series of VHF/UHF Mobile Radio Telephone Equipment Philips Telecommunication Review, vol. 41, No. 1 Apr. 1983 pp. 36-45.

* cited by examiner

*Primary Examiner*—Vivian Chin
*Assistant Examiner*—Eugene Yun
(74) *Attorney, Agent, or Firm*—Dicran Halajian

(57) ABSTRACT

A communication system includes first and second terminals which are able to communicate control messages to each other. One of the terminals can reconfigure itself by a process of service negotiations with the other terminal where the capabilities of the reconfigurable terminal are provided to the other terminal. Each of the terminals has a transceiver, a memory for storing software functions, and a processor for controlling the operation of the terminal in accordance with stored software functions. At least one of the software functions is alterable in response to the receipt of a control message containing the new software function plus interface software required by the processor in building a new function into an actual implementation on the terminal. The communication system may be a cordless and/or cellular telephone system where messages are sent over-the-air, or a corded system where messages are relayed by landline.

32 Claims, 2 Drawing Sheets

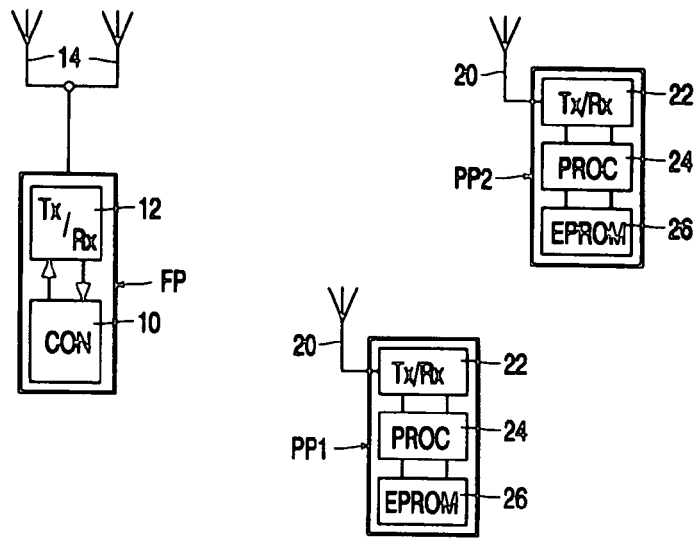
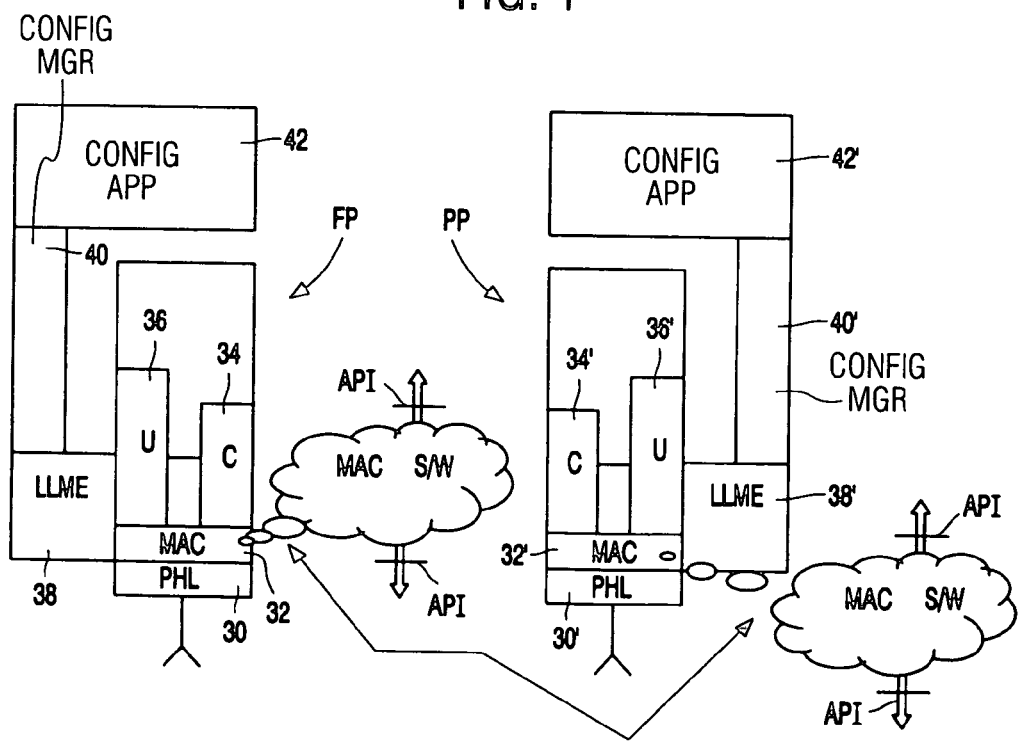
FIG. 1
FIG. 2

RECONFIGURABLE COMMUNICATION NETWORK

FIELD OF THE INVENTION

The present invention relates to a configurable/reconfigurable communication network which is, or terminals of which are, configurable or reconfigurable in response to data transmitted for example by corded or cordless, say over-the-air, link.

BACKGROUND OF THE INVENTION

It is known from Philips Telecommunication Review, Vol. 41, No. 1, April 1983 "FM-900 series of VHF/UHF mobile radio telephone equipment" by F. P. van Enk, pages 36 to 45 to provide mobile radio units with microprocessors and a central control PROM (programmable read only memory) whereby personality data associated with a channel number can be stored. As a consequence, when a user selects a channel, the mobile radio unit adapts 1 itself in accordance with the stored data so that it is ready to operate without any further intervention by the user. Such a radio unit requires the PROM to be programmed using an external programmer.

It is also known to supply data, such as receiver identity codes, to digital pagers by over-the-air transmissions.

In the field of telecommunications, particularly digital paging, in order to enable a user to roam in different geographical areas which operate different systems and/or different characteristics it was necessary for a traveller to carry two or more portable units, each of the portable units being configured to operate in a respective area. One proposal for avoiding the need to carry several portable units is disclosed in European Patent EP-B-0 538 933. The portable unit is able to be reconfigured in response to data downloaded from a device, for example a plastics card carrying the data, inserted in an aperture or slot and read by the portable unit.

In view of the plethora of communications standards in force and coming into force it is desirable for equipment at each end of a link to be compatible.

SUMMARY OF THE INVENTION

According to a first aspect of the present invention there is provided a method of operating a radio system comprising first and second terminals, the method comprising configuring/reconfiguring one of said first and second terminals by a process of service negotiation with the other of said first and second terminals.

More particularly the first aspect of the present invention provides a method of operating a radio system comprising first and second terminals, the method comprising one of said first and second terminals transmitting a message giving parameters relating to its capabilities, and the other of the first and second terminals receiving the message and configuring/reconfiguring itself in accordance with the received parameters.

According to a second aspect of the present invention there is provided a communications system comprising first and second terminals which are able to communicate with each other, wherein at least one of the first and second terminals has means for configuring/reconfiguring itself by a process of service negotiation.

The second aspect of the present invention also provides a communications system comprising first and second terminals which are able to communicate with each other, wherein at least one of the first and second terminals has means for configuring/reconfiguring itself in response to the receipt of a message transmitted by said other of the first and second terminals giving parameters relating to its capabilities.

According to a third aspect of the present invention there is provided a terminal for use in a communication system in which one terminal can configure/reconfigure another terminal by service negotiation, the terminal comprising a transceiver, a memory for storing software functions, and a processor for controlling the operation of the terminal in accordance with stored software functions, at least one of the software functions being alterable in response to the receipt of a message containing the new software function plus interface software required by the processor in building a new function into an actual implementation on the terminal.

The present invention is based on the concept that the primary station (or fixed terminal) can adapt itself in response to software (or other information) relayed over a communications link by a secondary station (or mobile terminal), and vice versa. Thus provided that the primary station or secondary station is capable of adapting or configuring/reconfiguring itself, it is possible for a range of equipments to be able to operate on a network without having to be set-up in advance in a factory. This is of particular importance when the same piece of equipment has to be capable to operate not only with different radio interfaces, protocols, compress/decompression algorithms and applications but also it has to be able to be agile in its operation to suit the prevailing radio environment.

An application running on a mobile terminal (or secondary station) and requiring communications facilities will normally need to establish a connection with another (peer) application on a remote terminal (or equivalent). The network may offer a standardised service tailored for the application and thus provide a communication channel with appropriate properties, for example (bit rate, delay, error rate and so forth). However, it may be that the application will be unknown to the network, and therefore the "nearest" suitable service could be offered. This would require some negotiation to take place between the terminal and network on the required and available link parameters. In another application the terminal may take an active part in configuring/reconfiguring the network to provide the required communications facilities.

In a radio system it is usually desirable to jointly optimise the source and channel coding. Therefore, if the source coding algorithm is unknown to the network, it is likely that the associated channel coding will also be unknown. Therefore the necessary information must be provided to the network to allow implementation of an effective solution. The same argument can be applied to the modulation scheme.

In some cases there may be more than one network involved in setting up a connection. Then the properties of each link should be considered, as well as the overall performance.

The uploading could be between terminals, for example to ensure that the applications at both ends of the link are compatible.

BRIEF DESCRIPTION OF THE DRAWINGS

The present invention will now be described, by way of example, with reference to the accompanying drawings, wherein:

FIG. 1 is a general diagram of a cordless/cellular telephone system,

FIG. 2 illustrates in block schematic form the software architecture of a reconfigurable DECT (Digitally Enhanced Cordless Telephone), fixed part and portable part.

In the drawings the same reference numerals have been used to indicate corresponding features.

DETAILED DESCRIPTION OF THE INVENTION

Figure 3:
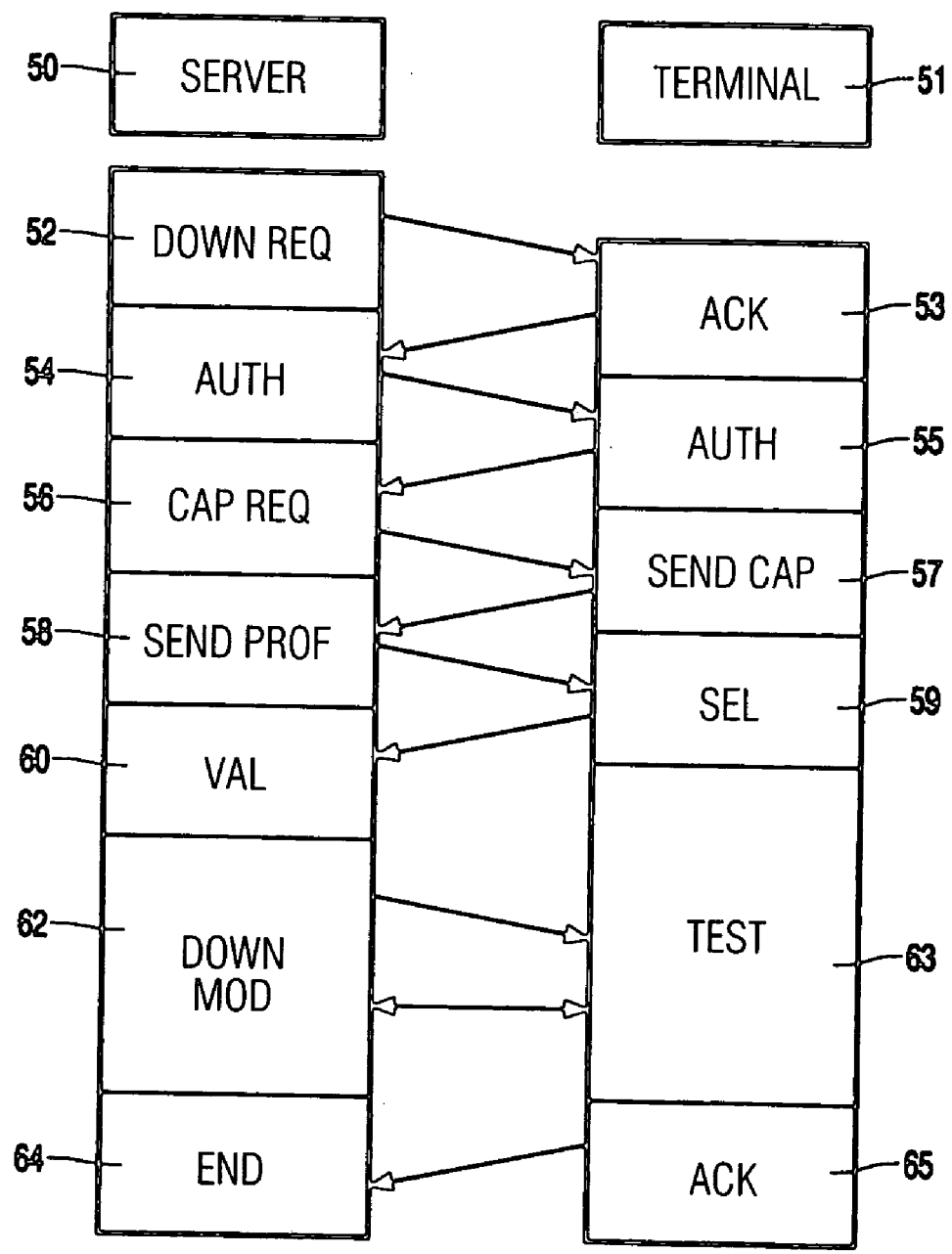
FIG. 3 is a diagram of the software download procedure.

Referring to FIG. 1, the communication system comprises a fixed part (or fixed terminal) FP and two portable parts (or mobile terminals) PP1, PP2. The fixed part FP comprises a network controller 10 which is effectively a large computer and which is coupled to a radio transceiver 12. An antenna 14 is coupled to the transceiver 12. Each of the portable parts PP1, PP2 comprises an antenna 20 coupled to a radio transceiver 22. A processor 24 having an EPROM 26 for storing configuration data is coupled to the transceiver 22.

For convenience of description, the illustrated system operates in accordance with the DECT (Digitally Enhanced Cordless Telephone) Standard. DECT is a TDMA standard comprising ten frequency channels, each channel being divided in the time domain into frames and each frame comprises 24 time slots, 12 being transmit time slots (or simplex physical channels) and 12 being receive time slots (or simplex physical channels). Correspondingly numbered transmit and receive time slots constitute a duplex voice pair.

As is known in the art DECT operates in accordance with a layered structure which comprises a Physical (PHL) layer, a Medium Access Control (MAC) layer, a Data Link Control (DLC) layer and a Network (NWK) layer. Some of the features of the PHL layer have been described in the previous paragraph. Of the other layers the MAC layer is of interest. The MAC layer specifies the broadcast message control service, the connectionless message control service and the multibearer control service. The MAC layer also specifies the logical channels and how they are multiplexed and mapped onto the physical channels. More particularly the MAC layer performs two main functions, firstly it selects physical channels, and then establishes and releases connections on those channels. Secondly it multiplexes (and demultiplexes) control information, together with higher layer information and error control information, into slot-sized packets. In the interests of brevity the DLC and NWK layers will not be described.

Referring to FIG. 2, there is shown the software architecture of a DECT based reconfigurable fixed part (or base station) FP and portable part (or mobile terminal) PP. The respective software architectures are mirror images of each other and for convenience of description the fixed part FP will be described and the same reference numerals shown with a prime will be used to refer to the corresponding features in the portable part PP.

The FP software architecture comprises the Physical (PHL) layer 30, the MAC layer 32, a C-plane (or control plane) 34 and U-plane (or user plane) 36 interface with the MAC layer 32. A configuration application 42 interfaces with a configuration manager 40 which is attached to a lower layer management entity (LLME) 38. The process is controlled by the configuration application 42 which is a high-level user interface application running as a user application. This enables the PP or FP to access Internet based servers for the retrieval of software. Application Program Interfaces (APIs) are used to allow generic elements to be used on different manufacturers' equipment.

The configuration manager 40 has three main options which are (1) take one module out and replace with another while the software is running, so called "Hot swapping", (2) run and test a new stack simultaneously with the currently used stack prior to changing-over stacks, so called "parallel stack operation, and (3) stop a protocol stack, compile a new downloaded function, test the new function and established a new connection, so called "stop and start". Option (3) is the simplest option and the one that is more likely to be used in practice.

In the case of the FP being reconfigured in response to proposals from the PP, the following software uploading is proposed.

(1) Negotiation of features. A dialogue between the PP and FP to ensure that both are aware of the relevant capabilities of the other. For example, PP may be interested in the end-to-end delay offered by the connection to the fixed network, or the bit error rate or packet loss rate in an ATM connection. There may also be a need for negotiation between terminals.

(2) Error handling. When a radio link is involved coding is likely to be a required for error detection and/or correction. The details of the coding (and interleaving) could be uploaded by the PP to the radio access part of the network (parameters or algorithm description). Similarly, decoding algorithms could be specified. Error detection and concealment mechanisms could be specified. Error concealment is applicable in real-time voice and video transmission. It could also be implemented at the end destination, and could include filling in missing data based on interpolation, or repetition of previous data, or in the case of speech, muting.

(3) Specialised automatic repeat request (ARQ) algorithms (or information specifying them) could be loaded into the network by the PP. This may be appropriate if real-time delay constraints need to be met, or to ensure efficient use of the communication channel (e.g. for large packets).

(4) Non standard modulations could be specified and algorithms provided to generate/demodulate them.

(5) Agents could be loaded into the network to handle communications issues on behalf of the user. Some examples include: transcoding (e.g. where the applications use different source coding algorithms), monitoring delay and quality of service.

(6) Specialised algorithms for packet handling could be specified (e.g. dealing with packet priorities, packing dropping under congested conditions).

(7) Encryption/decryption/electronic signature/watermarking algorithms could be uploaded to the FP by the PP.

The method and system in accordance with the present invention contemplates the possibility of the FP or PP being configured or reconfigured by software relayed by the other part. Apart from the changes already mentioned, the following elements may be reconfigured:

(a) Changing the mode of operation of a FP to a PP and vice versa which may be desirable in certain situations to cover short-lived events.

(b) In the case of the physical channel:

(1) Changing from single slot to multiple-slot (number of bearers of the physical channel) and vice versa.

(2) Changing the frame structure.

(3) Altering the Cyclic Redundancy Check (CRC) scheme.

(4) Changing or altering power control algorithms (not applicable to all cordless or cellular systems some of which, such as DECT, do not have provision for power control).

(c) Changing elements of the MAC layer software functionality:
(1) Altering the higher layers error control.
(2) Altering the Radio Signal Strength Indicator (RSSI) scheme.
(3) Altering the Automatic Repeat Request (ARQ) Scheme.
(4) Altering handover algorithms.

Thus it is possible to take a non-configured terminal or a configured terminal and to configure or reconfigure it with a desired profile. Configuration or reconfiguration can either be manual or automatic, for example link adaptation in difficult channel could occur automatically. To effect configuration or reconfiguration, a terminal may comprise a Field Programmable Gate Array (FPGA), a programmable processor or a dedicated Application Specific Integrated Circuits (ASICs) designed to operate differently dependent on external influences.

The method in accordance with the present invention is facilitated by the transfer of key parameters from one terminal to the other terminal about it's capabilities. Capabilities include the actual functions which are executed when a communications link is used. They include modulation type, bit rate, spreading codes (CDMA), number of carriers (OFDMA), etc. as well as the ability to accept new functions e.g. a new modulation scheme. Armed with the capability information the base station then selects the most appropriate software to download (or upload) from the mobile. This software does not have to contain actual code which is run on either one of the terminals, that is the PP or FP, it could be purely configuration information. As an example the following message sequence chart shows how a flexible air interface could be set up between a PP and FP. In this example the PP communicates it can transmit and receive RF modulation of any of three types (BPSK, QPSK and DQPSK), the FP can decide which modulation type is used, and instruct the PP to do so, by transferring a simple code which refers directly to the chosen modulation type.

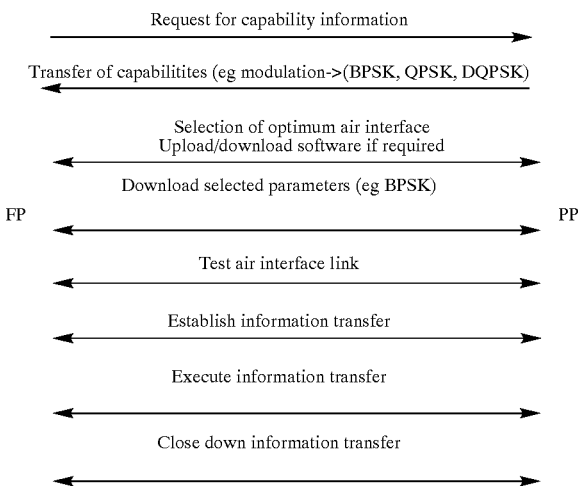

This configuration of the air interface permits a simple testing of the air interface to be included in which a call is set up to exercise the physical layer and assesses the potential quality of service (QoS) for the link. Thus the air interface is tested to ensure that configuration has taken place without error.

The testing scheme comprises the transmission of a known test pattern of data, which is generated by the FP and known "a prioria" by the PP.

The flexible air interface allows the adoption of adaptive spectrum management, where the FP can allocate different amount of spectrum to users dependant not only on the demands of the mobiles, but on the optimum usage of the available spectrum.

Caching can be used for frequently selected software upgrades.

In order to give another illustration of the method in accordance with the present invention, an example will be given of a series of events for reconfiguration of the CRC.

1. Decide to reconfigure the PP's or FP's CRC scheme in MAC layer.
2. Interrogate MAC layer of PP or FP to be programmed for software MAP.
3. Use built-in rules to discover if the PP or FP can have it's CRC scheme changed.
4. If change is possible, then download to PP or FP either:
New parameters for CRC scheme, or
new CRC scheme source code.

To reduce the amount of over the air transmission only the required function is transmitted plus any interface software required in building the new function into the actual implementation of the FP or PP. For example if the implementation was on an FPGA, then a compiler for the specific FPGA would also be required.

5. If source code, the PP or FP configuration manager 40 (FIG. 2) compiles a link-able binary, the compiler is a custom coded compiler specific for a particular platform. After compilation, the binary is linked in with other software. The software can run on a programmable processor or on a dedicated ASIC or could also be used to configure an FPGA implementing the new function. One method of software reconfiguration would be to define an area of memory accessed by the processor that is used for a particular function, this area could be replaced when a new function is downloaded.
6. If parameters, then update parameter storage locations
7. Run a test program which tests the new configuration
8. Setup a new call with newly reconfigured PP of FP Referring now to FIG. 3, this shows a typical generic software transfer from a Software Defined Radio (SDR) server 50 to a SDR terminal 51, either a PP or FP.

The transfer takes place in a number of phases.

Initiation:
In step 52, the server 50 initiates a download request.
In step 53, the terminal 51 acknowledges the download request.

Mutual Authentication:
In step 54, the server 50 authenticates the terminal 51.
In step 55, the terminal 51 authenticates the service provider and network operator.

Capability Exchange:
In step 56, the server 50 requests the terminal 51 to transmit its capability date.
In step 57, the terminal 51 transmits its capability response.
In step 58, the server 50 selects the appropriate software entities and parameter sets to match the capability of the terminal 51 and opens a download channel. (If no matching set of parameters exist, the operation is terminated). Transmit download installation profile.

Download Acceptance Exchange:

In step 58, the server 50 transmits Download Installation Profile.

Download Acceptance Exchange:

In step 59, the terminal 51 selects the installation options and also accepts or rejects the terms. In step 60, the server 50 validates the selected options.

Software Download:

In step 62, the server 50 downloads code modules including capability tables and delivery wrappers for each entity procedure.

In step 63, the terminal 51 tests the delivery integrity. Also it requests retransmissions as appropriate.

In step 65, the terminal 51 acknowledges safe receipt.

In step 64, the server 50 terminates the downloading.

Although the present invention has been described with respect to DECT, it is equally applicable to other one or two-way communication systems having a radio interface, a corded/landline interface or a combination of both between the PP and FP. In the case of a one-way communication system, control signalling is two-way and the system may be implemented using a separate one-way communications system for example a DAB (digital audio broadcasting) system with a GSM two-way control channel.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of reconfigurable communication networks/terminals therefor and which may be used instead of or in addition to features already described herein.

What is claimed is:

1. A method of configuring a profile of a fixed terminal comprising:

transmitting capabilities of said fixed terminal to a mobile terminal;

selecting by said mobile terminal parameters that match said capabilities and transmitting said parameters to said fixed terminal;

selecting by said fixed terminal a portion of said parameters to form selected parameters and informing said mobile terminal of said selected parameters; and transmitting by said mobile terminal to said fixed terminal required information to form said profile based on said selected parameters.

2. The method of claim 1, further comprising requesting said capabilities of said fixed terminal by said mobile terminal.

3. The method of claim 1, further comprising testing delivery integrity of said required information.

4. The method of claim 1, further comprising:

testing delivery integrity of said required information; and requesting retransmission of said required information if said testing indicates an error in said delivery integrity.

5. The method of claim 1, further comprising acknowledging proper reception of said required information.

6. A communication terminal comprising:

means for transmitting capabilities of said communication terminal to another terminal;

means for receiving parameters from said another terminal, said parameters matching said capabilities;

means for selecting a portion of said parameters to form selected parameters and informing said another terminal of said selected parameters;

means for receiving from said another terminal required information to form a profile of said communication terminal based on said selected parameters; and means for configuring said profile in response to said required information from said another terminal.

7. The communication terminal of claim 6, further comprising means for requesting said capabilities of said communication terminal by said another terminal.

8. The communication terminal of claim 6, further comprising means for testing delivery integrity of said required information.

9. The communication terminal of claim 6, further comprising:

means for testing delivery integrity of said required information; and means for requesting retransmission of said required information if said testing indicates an error in said delivery integrity.

10. The communication terminal of claim 6, further comprising means for acknowledging proper reception of said required information.

11. A communication terminal comprising:

a memory which stores data indicative of capabilities of said communication terminal;

a transmitter which transmits said capabilities to another terminal;

a receiver which receives parameters from said another terminal, said parameters matching said capabilities; and a controller which selects a portion of said parameters to form selected parameters and informs said another terminal of said selected parameters;

said receiver receiving from said another terminal required information to form a profile of said communication terminal based on said selected parameters; and said controller configuring said profile in response to said required information from said another terminal.

12. The communication terminal of claim 11, wherein said another terminal is configured to request said capabilities of said communication terminal.

13. The communication terminal of claim 11, wherein said controller is configured for testing delivery integrity of said required information.

14. The communication terminal of claim 13, wherein said controller is configured to request retransmission of said required information if said testing indicates an error in said delivery integrity.

15. The communication terminal of claim 11, wherein said controller is configured to acknowledge proper reception of said required information.

16. A method of establishing a communications link between a mobile terminal and a fixed terminal, the method comprising:

transmitting capabilities of said fixed terminal to said mobile terminal;

selecting by said mobile terminal parameters that match said capabilities and transmitting said parameters to said fixed terminal;

selecting by said fixed terminal a portion of said parameters to form selected parameters and informing said mobile terminal of said selected parameters; and transmitting by said mobile terminal to said fixed terminal required information to form a profile based on said selected parameters to establish said communications link.

17. A method as claimed in claim 16, wherein the mobile terminal transmits the required function plus software required in building a new function into an actual implementation on the fixed terminals.

18. A method as claimed in claim 16, further comprising testing the air interface to ensure that said configuring has taken place without error.

19. The method of claim 16, further comprising requesting said capabilities of said fixed terminal by said mobile terminal.

20. The method of claim 16, further comprising testing delivery integrity of said required information.

21. The method of claim 16, further comprising:
testing delivery integrity of said required information; and
requesting retransmission of said required information if said testing indicates an error in said delivery integrity.

22. The method of claim 16, further comprising acknowledging proper reception of said required information.

23. A fixed terminal for use in a communication system to establish a communications link with a mobile terminal, the fixed terminal comprising:
a transceiver configured to transmit capabilities of said fixed terminal to said mobile terminal, said mobile terminal selecting parameters that match said capabilities and transmitting said parameters to said fixed terminal; and
a controller configured to select a portion of said parameters to form selected parameters and inform said mobile terminal of said selected parameters;
wherein said mobile terminal configured to transmit to said fixed terminal required information to form a profile based on said selected parameters to establish said communications link.

24. The fixed terminal of claim 23, wherein said mobile terminal is configured to request said capabilities of said fixed terminal.

25. The fixed terminal of claim 23, wherein said controller is configured for testing delivery integrity of said required information.

26. The fixed terminal of claim 25, wherein said controller is configured to request retransmission of said required information if said testing indicates an error in said delivery integrity.

27. The fixed terminal of claim 23, wherein said controller is configured to acknowledge proper reception of said required information.

28. A mobile terminal for use in a communication system to establish a communications link with a fixed terminal, the mobile terminal comprising:
a transceiver configured to receive capabilities of said fixed terminal;
said mobile terminal selecting parameters that match said capabilities and transmitting said parameters to said fixed terminal; and
a controller configured to select parameters that match said capabilities, said transceiver transmitting said parameters to said fixed terminal;
wherein said fixed terminal is configured to select a portion of said parameters to form selected parameters and inform said mobile terminal of said selected parameters;
said mobile terminal being configured to transmit to said fixed terminal required information to form a profile based on said selected parameters to establish said communications link.

29. The mobile terminal of claim 28, wherein said controller is configured to request said capabilities of said fixed terminal.

30. The mobile terminal of claim 28, wherein said fixed terminal is configured for testing delivery integrity of said required information.

31. The mobile terminal of claim 30, wherein said fixed terminal is configured to request retransmission of said required information if said testing indicates an error in said delivery integrity.

32. The mobile terminal of claim 28, wherein said fixed terminal is configured to acknowledge proper reception of said required information.

* * * * *